J. W. McAULIFFE.
SANITARY TRAP.
APPLICATION FILED JULY 28, 1910.

1,085,055.

Patented Jan. 20, 1914.

Witnesses:
Arthur T. Randall
John H. Parker

Inventor:
John W. McAuliffe
by Macleod Calm Copeland & Dike
Attys.

UNITED STATES PATENT OFFICE.

JOHN W. McAULIFFE, OF NEW YORK, N. Y., ASSIGNOR TO JOSEPH A. MAYNARD, OF BOSTON, MASSACHUSETTS.

SANITARY TRAP.

1,085,055.  Specification of Letters Patent.  Patented Jan. 20, 1914.

Application filed July 28, 1910. Serial No. 574,267.

*To all whom it may concern:*

Be it known that I, JOHN W. MCAULIFFE, a citizen of the United States, residing at New York, county of New York, State of New York, have invented a certain new and useful Improvement in Sanitary Traps, of which the following is a specification, reference being had therein to the accompanying drawings.

This invention has reference to an improvement in sanitary traps used to form a water-seal in the waste pipes of sanitary plumbing.

The object of my invention is to construct a sanitary trap that can be opened and the sediment removed from the trap without breaking the seal formed by the fluid in the trap.

My invention consists in the peculiar and novel construction of a sanitary trap having a cylindrical body with inlet and outlet ducts, a closed bottom, and a top having a downwardly-extending central tube open at its lower end and closed at the upper end by a removable cover, the lower end of the tube extending below the water line to form a seal. The sediment in the bottom of the trap is removed through the central tube without removing the liquid forming the seal in the trap, as will be more fully set forth hereinafter.

Figure 1:
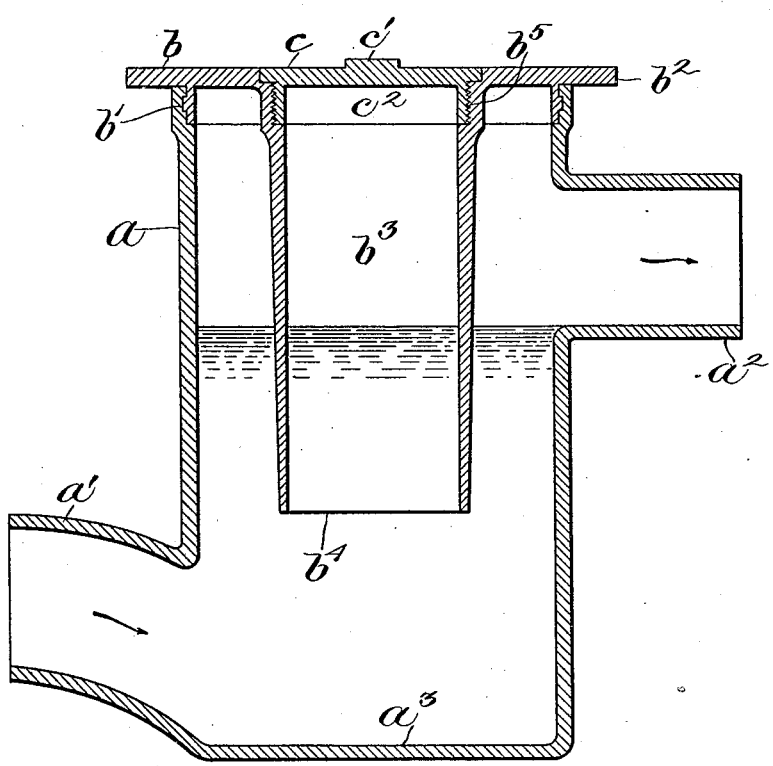
Figure 2:
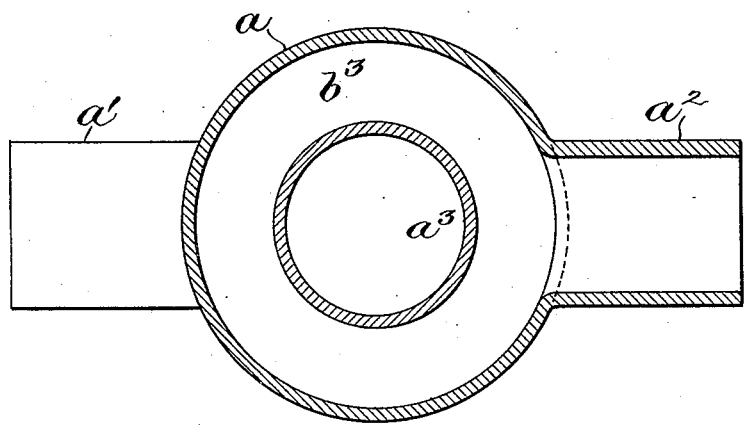

Figure 1 is a vertical sectional view of my improved sanitary trap, showing the central clean-out tube extending downward in the trap below the water line to form a seal, and to assist in preventing the trap from siphoning, and Fig. 2 is a transverse sectional view taken on a line through the outlet duct of the trap.

In the drawings, $a$ represents the cylindrical body, $a'$ the inlet duct, $a^2$ the outlet duct, and $a^3$ the closed bottom of my improved sanitary trap formed in one piece. The top $b$ of the trap has the downwardly-extending circular lip $b'$ on which the upper end of the trap body $a$ is cast, the outwardly-extending flange $b^2$ forming a support for the trap, and the downwardly-extending central clean-out tube $b^3$ having the open end $b^4$ below the water line in the trap to form a seal and the upper end $b^5$ where it merges with the top $b$ closed by the removable cover $c$ having the nut head $c'$ and the circular lip $c^2$ in screw-thread engagement with the upper end $b^5$ of the clean-out tube $b^3$. The cover $c$ is removed by a wrench on the nut head $c'$.

When the trap is to be cleaned the cover $c$ is removed and the sediment which has collected in the bottom of the trap may be taken out through the clean-out tube $b^3$ without removing the fluid in the trap and breaking the seal. The water line in the trap being above the lower open end $b^4$ of the clean-out tube prevents sewer gas or poisonous odors from entering the premises through the open trap, while the trap is being cleaned, and the fluid in the clean-out tube $b^3$ assists in preventing the siphoning of the trap at the end of the flow of fluid through the trap.

What I claim is:

In a sanitary trap, the combination with the cylindrical body $a$ having the inlet duct $a'$, the outlet duct $a^2$, and the closed bottom $a^3$, of the top $b$ having the downwardly-extending circular lip $b'$ on which the upper end of the body $a$ is cast, the outwardly-extending flange $b^2$ forming a support for the trap, and the clean-out tube $b^3$ formed by a cylindrical extension of the top $b$ extending downward in the body $a$ with its lower open end $b^4$ below the water line and having the upper end $b^5$ where it merges with the top $b$ closed by the cover $c$ having the nut head $c'$ and the circular lip $c^2$ in screw-thread engagement with the upper end $b^5$ of the clean-out tube $b^3$, all for the purpose as described.

In testimony whereof I affix my signature, in presence of two witnesses.

JOHN W. McAULIFFE.

Witnesses:
WILLIAM A. MACLEOD,
ALICE H. MORRISON.